United States Patent [19]
Howard et al.

[11] 3,924,448
[45] Dec. 9, 1975

[54] PRESSURE DROP POLYMER CONCENTRATION METER (PCM)

[75] Inventors: Robert G. Howard, Annapolis; Edwin L. Zivi, Jr., Severna Park, both of Md.

[73] Assignee: The United States of America as represented by the Secretary of the Navy, Washington, D.C.

[22] Filed: June 19, 1974

[21] Appl. No.: 480,775

[52] U.S. Cl. .......................... 73/55; 73/53; 73/197; 73/61.1
[51] Int. Cl.[2] .......................................... G01N 11/04
[58] Field of Search............ 73/55, 61.1 R, 197, 198, 73/53; 23/306

[56] References Cited
UNITED STATES PATENTS
2,971,371   2/1961   Brennan et al. ........................ 73/53

*Primary Examiner*—Richard E. Aegerter
*Assistant Examiner*—Larry Jones
*Attorney, Agent, or Firm*—R. S. Sciascia; Q. E. Hodges; D. McGiehan

[57] ABSTRACT

Apparatus for, and a method of determining the concentration of drag reducing polymer in a medium by accurate dilution with water and subsequent flow measurement in a restrictor tube. The solution to be measured, having a concentration of 100–6000 ppm, is sampled in a continuous process and metered at an accurate flowrate. The solution is then diluted at a known ratio with water having a flowrate determined by measuring the pressure drop along a length of the tube. The flowrate of the water-plus-drag reducing polymer is determined by measuring the pressure drop along a similar length of tube farther downstream. Percent drag reduction is determined by comparing the pressure drop for water and for water-plus-drag reducing polymer solution. Comparison of this percent drag reduction data with the calibration data of the apparatus yields a concentration. Multiplying this concentration with the known dilution ratio yields the concentration of the original solution.

5 Claims, 1 Drawing Figure

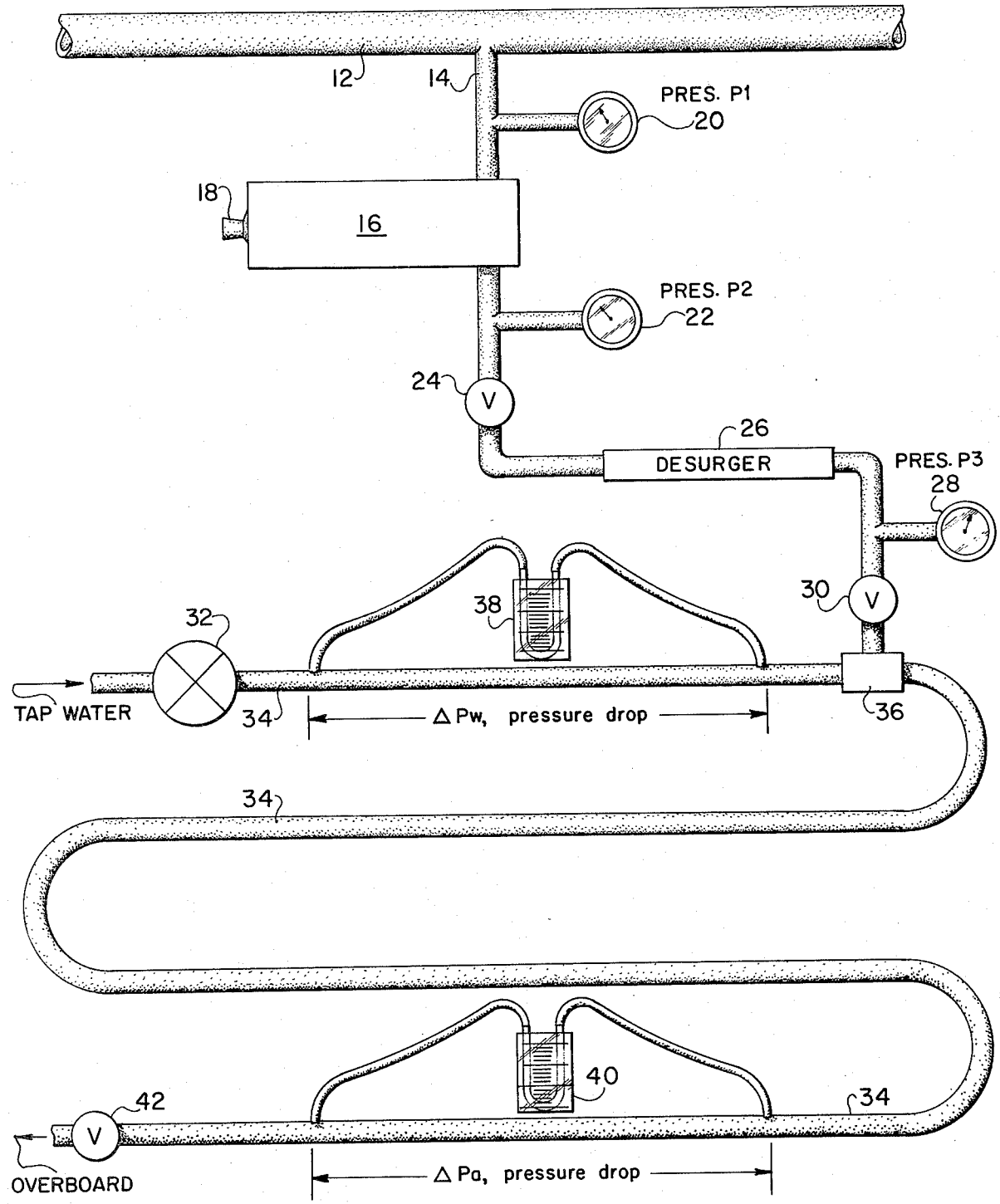

PRESSURE DROP POLYMER CONCENTRATION METER (PCM)

The invention described herein may be manufactured and used by or for the Government of the United States of America for governmental purposes without the payment of any royalties thereon or therefor.

BACKGROUND OF THE INVENTION

The instant invention relates generally to measuring fluid flow and more particularly to measuring the percentage of the drag reducing constituents of the fluid.

Heretofore, the methods for measuring the concentration of drag reducing polymers in a water solution used the Hoyt rheometer or the Union Carbide Company's turbidity method.

The Hoyt rheometer method involves measuring the pressure drop through a capillary tube of known length and characteristics. When measuring drag reducing agents, the pressure drop for water is greater than the pressure drop for solutions of the agent. Also, the pressure drop decreases for greater concentrations up to a certain point. However the Hoyt rheometer method is limited to measuring concentrations in the range of 2–20 parts per million (ppm) in solution. Greater concentrations must first be diluted manually to concentrations in the 2–20 ppm range. This batch method requires relatively long and constant attention by an operator to obtain a single sample concentration reading. A further problem is that samples must be introduced only a few milliliters at a time and therefore may not be a representative sample of the whole quantity to be measured. The Union Carbide Company's U.S. Pat. No. (3,085,081) turbidity method is not satisfactory because it is suitable for only polyethylene oxide resins and fresh water solutions. The method involves a polyethylene oxide resin having a modifying quantity of crystalline complex added, and the application of pressure and high temperature. It requires several hours to perform and obtain a single reading.

SUMMARY OF THE INVENTION

Accordingly, an object of the instant invention is to provide a new and improved method of determining the concentration of a drag reducing agent in fresh water and sea water.

Another object of the present invention is to provide a method of measuring an extensive range of concentration of a drag reducing agent in a solution.

Still another object of the instant invention is to provide a method of measuring the concentration of a drag reducing agent in continuous, on-line process.

A further object of the instant invention is to provide a method and apparatus for determining the concentration of a drag reducing agent in a solution by measuring the agent's effect on the flow of the solution.

Briefly these and other objects of the instant invention are attained by the use of apparatus comprising a restrictor tube of known flow characteristics, flow meters, pressure gauges, and a precision metering pump combined to determine flowrates by measuring the pressure drops along portions of the tube. The pressure drops can then be correlated with concentration of the drag reducing agent, since a greater concentration increases flow and therefore reduces pressure drop.

BRIEF DESCRIPTION OF THE DRAWINGS

A more complete understanding of the invention and many of the attendant advantages thereof will be readily appreciated as the same become better understood by reference to the following detailed description when considered in connection with the accompanying drawings wherein the FIGURE is a schematic diagram of the piping arrangement and apparatus used in the method according to the invention.

DESCRIPTION OF THE PREFERRED EMBODIMENT

Referring now to the drawings there is shown generally in the FIGURE a polymer concentration meter 10, having a pipe 12, carrying the dissolved drag reducing polymer solution to be measured. A tap 14 on pipe 12 obtains a sample of the solution and introduces it to a metering pump 16 having a micrometer flow adjustment 18. This pump may be a "Milroyal" model type A, or the like. A pressure gauge 20 is connected to the input, and another pressure gauge 22 is connected to the output of the metering pump 16. A back-pressure valve 24 is connected to the output of the metering pump just downstream of the output pressure gauge 22. Downstream of the back pressure valve 24, a desurger 26 is connected to smooth out flow fluctuations, and another pressure gauge 28 is connected after the desurger 26 to monitor the pressure of the solution at a point following the desurger 26. Connected immediately downstream of the pressure gauge 28 is a regulating valve 30.

A flow regulator 32 is connected to a source of water, which feeds water to a restrictor tube 34. The restrictor tube may be a capillary tube having a precise diameter such as 0.4 inch and a predetermined length. Downstream along the restrictor tube 34, is a disperser-mixer 36, which is also connected to the regulating valve 30 and where accurate dilution of the drag reducing polymer solution to be measured occurs. Intermediate the water flow regulator 32 and the disperser-mixer 36, a manometer 38 is connected to span a predetermined length of the restrictor tube 34 for measuring the pressure drop along this length. Farther downstream along the restrictor tube 34, another manometer 40 is connected for measuring the pressure drop along a similar length of the restrictor tube. At the end of the restrictor tube, a back pressure valve 42 may be connected to control the overall flow in the apparatus.

The operation of this pressure drop concentration meter is in part, similar to the principle of operation of the Hoyt rheometer, however the instant invention extends the range of concentration measurement and operates as an "on-line" or continuous process measuring instrument. Initially, the material to be measured, that is, the dissolved drag reducing polymer solution, at a concentration of approximately 100 to 6000 ppm, flowing in pipe 12 is sampled at tap 14. The sample solution is then fed to a metering pump 16 the output of which is accurately regulated by the micrometer flow adjustment 18 and its pressure is maintained by adjustment of the back-pressure valve 24. The back-pressure can be adjusted by reference to the input pressure gauge 20 and output pressure gauge 22. The solution then enters the desurger 26, which is essentially an increased volume that smooths out any possible pressure surges. The solution is then carefully metered through a regulating valve 30, while its pressure is monitored by the pressure gauge 28, all this to know its flowrate to determine a dilution ratio. It is then injected and accurately diluted with water in the disperser-mixer 36 to a known dilution ratio to a concentration of approximately 2 to 20 ppm.

The water enters the system at a known flowrate, which is maintained by flow regulator 32 before it enters the restrictor tube 34. A manometer 38, spanning a predetermined length of restrictor tube measures the pressure drop, $\Delta p_w$, of the water to be added before it reaches the disperser-mixer 36. The precise flowrate of the dilution water may be determined from this pressure drop along the restrictor tube. After dilution, the water-plus-drag reducing polymer solution, at a concentration of approximately 2–30 ppm, continues downstream along the restrictor pipe 34, and its pressure drop $\Delta p_a$, from which flowrate may be determined, is measured by another manometer 40 spanning a similar length of restrictor tube farther downstream. From these measurements, the effect of the drag reducing polymer on flowrate may be determined.

Thus with this apparatus and method, a drag reducing polymer solution at a concentration of 100–6000 ppm is diluted down at a known dilution ratio to a concentration of 2–30 ppm. With this diluted solution, drag reduction may be directly correlated with concentration by reference to the calibration data of the apparatus.

To calculate concentration: The pressure drop of the water $\Delta p_w$ in the restrictor tube is obtained by manometer 38 and can be converted to flowrate. The setting on the dial of the micrometer flow adjustment 18, of the metering pump 16 gives the flowrate of the solution. The resultant pressure drop, $\Delta p_a$, of the mixed and diluted solution is obtained by manometer 40 where the total flow passes through the restrictor tube. Percent drag reduction is calculated from the equation $\%DR = 100(1 - \Delta P_a/\Delta P_w)$, where $\Delta P_w$ is the pressure drop of fresh water and $\Delta P_a$ is the pressure drop of the diluted solution of drag reducing polymer. Concentration is then determined from comparison of the test results with calibration data which relate concentration with percent drag reduction. The concentration of the diluted solution may then be multiplied by the dilution ratio to determine the initial concentration.

Obviously, many modifications and variations of the present invention are possible in light of the above teachings. It is therefore to be understood that within the scope of the appended claims, the invention may be practiced otherwise than as specifically described.

What is claimed is:

1. A method of determining the dissolved concentration of drag reducing polymer in a medium, comprising the steps of:
    metering, at a precise flowrate, the drag reducing polymer solution to be measured;
    diluting said drag reducing polymer solution with water to obtain a measurable concentration of the polymer;
    measuring the pressure drop of the water along a predetermined length of restrictor tube;
    measuring the pressure drop of the diluted drag reducing polymer solution along a similar predetermined length of restrictor tube;
    correlating the pressure drop of the water with that of the diluted drag reducing polymer solution to obtain percent drag reduction;
    comparing the correlation with calibration data of the apparatus which relates concentration to percent drag reduction; and
    multiplying the concentration found by the dilution ratio of the drag reducing polymer solution with water.

2. A method of determining the dissolved concentration of drag reducing polymer in a medium, comprising the steps of:
    diluting said drag reducing polymer solution to measurable concentration;
    measuring the pressure drop of the diluted solution in a restrictor tube;
    measuring the pressure drop of fresh water in a restrictor tube;
    correlating said pressure drops; and
    comparing the correlation with calibration data of the apparatus which relates concentration to percent drag reduction.

3. The method of claim 2 further comprising the steps of:
    metering the flowrate of the drag reducing polymer solution to be measured; and
    metering the flowrate of water to dilute said drag reducing polymer solution to a known dilution ratio; and
    multiplying the concentration found by the dilution ratio to obtain the concentration of the original drag reducing polymer solution under consideration.

4. Apparatus for determining the dissolved concentration of drag reducing polymer in a medium comprising:
    a metering pump sampling and providing a known flow-rate of polymer solution to be measured;
    a source of water for further diluting the polymer solution to a concentration measurable by flow-rate effects;
    a dispenser-mixer connected to said metering pump and said source of water for combining the polymer solution and the water;
    a predetermined length of restrictor tubing connected between said source of water and said disperser-mixer;
    a manometer spanning said predetermined length of restrictor tubing for measuring the pressure drop and hence flow-rate of the water therein;
    a similar length of restrictor tubing connected to and farther downstream from said predetermined length; and
    another manometer spanning said similar length of restrictor tubing, whereby the pressure drop and hence the flow-rate of the drag reducing polymer plus the water may be determined and compared to the flow-rate of the water.

5. The apparatus of claim 4 wherein said metering pump further comprises:
    micrometer flowrate adjustment means for regulating the flow of drag reducing polymer solution to be measured.

* * * * *